US005789045A

United States Patent [19]

Wapner et al.

[11] Patent Number: 5,789,045

[45] Date of Patent: Aug. 4, 1998

[54] MICROTUBES DEVICES BASED ON SURFACE TENSION AND WETTABILITY

[75] Inventors: Phillip G. Wapner; Wesley P. Hoffman, both of Palmdale; Gregory Price, Lancaster, all of Calif.

[73] Assignee: The United States of America as represented by the Secretary of the Air Force, Washington, D.C.

[21] Appl. No.: 649,861

[22] Filed: May 10, 1996

Related U.S. Application Data

[63] Continuation of Ser. No. 472,575, Jun. 7, 1995, abandoned, which is a continuation-in-part of Ser. No. 229,962, Apr. 15, 1994.

[51] Int. Cl.[6] .......... B32B 31/08; F16K 15/00; F16K 17/00; F16K 21/00; F15B 21/00

[52] U.S. Cl. .......... 428/34.4; 73/432.1; 137/513.7; 137/807; 137/802; 251/368; 310/300; 310/40 MM; 415/111; 415/232; 428/36.9; 428/36.92; 428/398; 428/903

[58] Field of Search .......... 73/432.1; 137/513.7, 137/807, 802; 251/368; 310/300, 40 MM; 415/111, 232; 428/34.4, 36.9, 36.92, 398, 903

[56] References Cited

U.S. PATENT DOCUMENTS

| | | | |
|---|---|---|---|
| 3,985,027 | 10/1976 | Trieon . | |
| 4,900,483 | 2/1990 | Witzke et al. | 264/29.2 |
| 4,982,068 | 1/1991 | Pollock et al. | 427/122 |
| 5,011,566 | 4/1991 | Hoffman | 156/643 |
| 5,094,906 | 3/1992 | Witzke et al. | 264/29.2 |
| 5,187,399 | 2/1993 | Carr et al. | 310/40 MM |
| 5,189,323 | 2/1993 | Carr et al. | 310/40 MM |
| 5,252,881 | 10/1993 | Muller et al. | 310/40 MM |
| 5,262,695 | 11/1993 | Kurwano et al. | 310/40 MM |
| 5,298,298 | 3/1994 | Hoffman | 428/34.4 |
| 5,352,512 | 10/1994 | Hoffman | 156/155 |
| 5,366,587 | 11/1994 | Ueda et al. | 156/651 |
| 5,378,583 | 1/1995 | Guckel et al. | 430/325 |
| 5,426,942 | 6/1995 | Suzuki . | |

*Primary Examiner*—James C. Cannon
*Attorney, Agent, or Firm*—Stanton E. Collier

[57] ABSTRACT

In the present invention, various sizes of non-wetting droplets are inserted into microtube devices of various shapes having therein a gas or wetting fluid which causes the droplets to movement in response to fluid pressure. The droplets may translate within a void of the microtube device which is filled with the gas or wetting fluid or rotate in a fixed position. The nonwetting fluid may also be formed into rings within ring shaped channels. The microtube devices may operate to stop fluid flow, act as a check-valve, act as a flow restrictor, act as a flow regulator, act as a support for a turning axle, and act as a logic device, for example.

12 Claims, 5 Drawing Sheets

MICROTUBES DEVICES BASED ON SURFACE TENSION AND WETTABILITY

CROSS REFERENCE TO RELATED APPLICATION

This application is a continuation of application Ser. No. 08/472,575, filed 7 Jun. 1995, now abandoned, which is a continuation-in-part of application Ser. No. 08/229,962 filed on 15 Apr. 1994, the disclosure of which is incorporated herein by reference.

STATEMENT OF GOVERNMENT INTEREST

The invention described herein may be manufactured and used by or for the Government for governmental purposes without the payment of any royalty thereon.

BACKGROUND OF THE INVENTION

The present invention relates to micromachines, and, in particular, relates to microtube devices.

The phenomenal impact of miniaturization of electronics on civilization in the last 30 years has been unforeseen. Some mechanical devices have been incorporated into integrated circuitry such as sensors using vibrating foils, etc., but the development of true micromachines has yet to be fully developed or appreciated.

As miniaturization of mechanical and electrical systems occurs, the role of physical and chemical effects and parameters have to be reappraised. Some effects, such as those due to gravity or ambient atmospheric pressure, are relegated to minor roles, or can even be disregarded entirely, while other effects become elevated in importance or, in some cases, actually become the dominating variables. This "downsizing reappraisal" is vital to successful miniaturization. In a very real manner of speaking, new worlds are entered into, in which design considerations and forces that are normally negligible in real-world applications become essential to successful utilization and application of the miniaturized technology.

Surface tension and the closely-related phenomena, wettability, are usually not comparable in effect to normal physical forces at macroscopic levels. For example, surface tension is usually ignored when determining fluid flow through a pump or tube. Its effect is many orders-of-magnitude smaller than pressure drop caused by viscosity. That is because difference in pressure, $\Delta P$, existing between the inside of a droplet and the outside is given by the relationship $$\Delta P=2\gamma/r$$

where $\gamma$ is surface tension and r is droplet radius. Normally, in most macroscopic applications, droplet dimensions are measured in hundreds, if not thousands, of microns. Pressure differences due to surface-tension effects are therefore inconsequential, typically measuring far less than atmospheric pressure. For comparison, pressure drops resulting from viscous flow are typically on the order-of-magnitude of tens of atmospheres. When r is on the order of microns, however, pressure differences becomes enormous, frequently surpassing hundreds of atmospheres.

Thus, there exists a need for microtube devices using the above principles.

SUMMARY OF THE INVENTION

In the present invention, various sizes of non-wetting droplets are inserted into microtube devices of various shapes having therein a gas or wetting fluid which causes the droplets to move in response to fluid or gas pressure. The droplets may translate within a void of the microtube device which is filled with the gas or wetting fluid or rotate in a fixed position. The microtube devices may operate to stop fluid flow, act as a check-valve, act as a flow restrictor, act as a flow regulator, act as a support for a turning axle, and act as a gate, for example. The microtubes of interest to the present invention range in inside diameter from about 20 nanometers to about 1000 microns.

Therefore, one object of the present invention is to provide microtube devices.

Another object of the present invention is to provide microtube devices which utilize surface tension and wettability to operate.

Another object of the present invention is to provide microtube devices which control the flow of fluid therein (i.e., both wetting and nonwetting liquids as well as gases).

Another object of the present invention is to provide microtube devices which may support objects in motion, either in translation or rotation or both.

Another object of the present invention is to provide microtube devices which employ digital logic.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

This invention relates to the use of surface properties of materials, primarily surface tension and wettability, as the principle means of actuating and controlling motion both by and within microtube devices. These devices are capable of performing mechanical tasks whose scale of motion is measured in microns.

Figure 1:
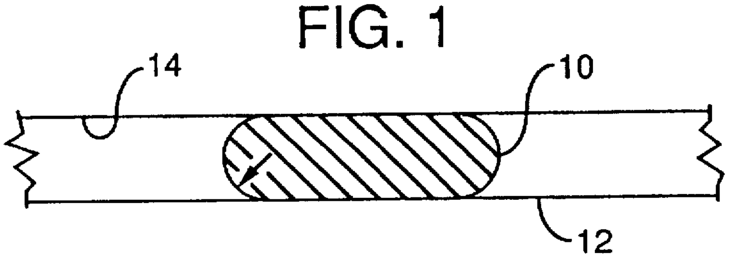
FIG. 1 illustrates a microtube having a non-wetting droplet therein.

In FIG. 1, a nonwetting fluid droplet 10 is forced through a single microtube 12 An initial pressure has to be employed to push the droplet 10 inside the microtube 12. Once it is inside, however, no further pressure is necessary. In fact, any pressure will simply move the droplet 10 along the microtube 12. Its velocity will be decided by the applied pressure as well as the frictional forces between the droplet 10 and the microtube wall 14. If the diameter of the microtube is decreased at a certain point forming a microtube 16 having a first section 18 and a second section 20, as in FIG. 2, a considerably higher pressure must be applied to squeeze the nonwetting drop 10 into the smaller microtube, second section 20. This effect does not take place if the fluid wets the microtube surface. In that case, fluid flow is governed only by frictional forces. This is the situation in normal macroscopic applications. By inserting an appropriately-sized nonwetting droplet 10 into a microtube 12 filled with another fluid 22 that wets the tube walls, all flow can be stopped by applying a pressure that forces the nonwetting droplet to block the entrance to the smaller tube. This is the situation in FIG. 2 where the nonwetting droplet 10 has been forced to the intersection 24 of the larger and smaller microtubes by the flowing tube-gas or wetting fluid 22. FIGS. 3A and 3B illustrate an extension of this concept. By adding additional small-diameter microtube bypass-flow paths 26 and 28 to one end of a doubly constricted tube 30, flow will only be possible in the direction of the end 32 having the added flow paths 26 and 28 thereon. Of course, these bypass tubes 26 and 28 must be properly sized to prevent nonwetting droplets from squeezing into them. This microtube device 34 acts as a check-valve with no solid moving parts which simply cannot be achieved at the macroscopic level because forces arising from surface tensions of all real fluids are too small due to the much larger geometries employed.

Figure 4:
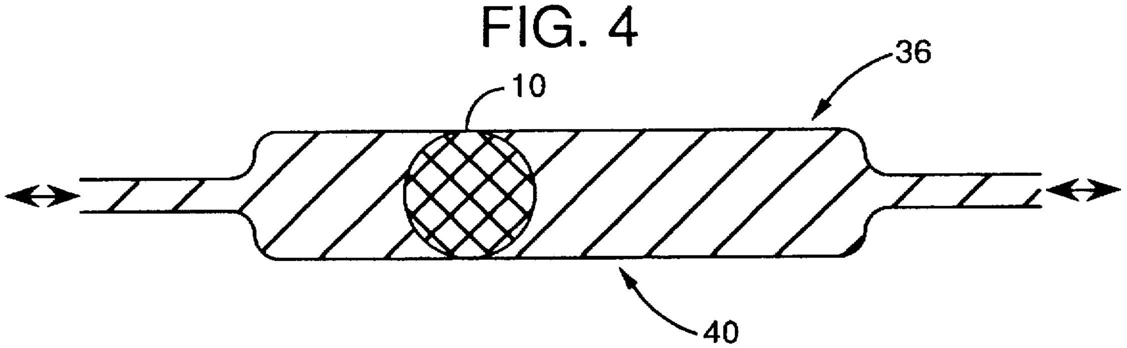
FIG. 4 illustrates a flow-limiter
Figure 5:
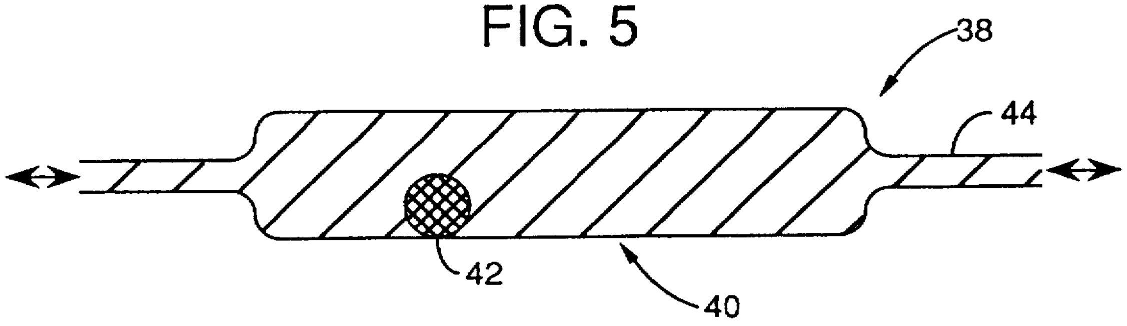
FIG. 5 illustrates a flow-restrictor.

FIGS. 4 and 5 are further extensions of this same concept. In FIG. 4, bypass tubes are left off the microtube check-valve converting it to either a microtube flow-limiter 36 or a microtube flow-restricter 38. In FIG. 4, the only wetting-fluid flow that can now occur is when the non-wetting droplet 10, volume is $V_1$, travels back and forth in the larger diameter microtube section 40, whose volume is $V_2$. Because the non-wetting droplet 10 is made large enough to completely seal the large-diameter microtube section 40 preventing any flow around the non-wetting droplet 10 the volume of back-and-forth flow is $V_2-V_1$. In FIG. 5, the diameter of the non-wetting droplet 42 is made smaller than the diameter of the larger microtube 40, but larger than the diameter of the smaller microtube 44. Some flow can now take place around the non-wetting droplet 42 therefore the volume of back-and-forth flow will be greater than $V_2-V_1$. Fluid flow is not merely restricted, but will be entirely stopped with enough flow to push the drop to one end blocking the smaller tube.

Figure 6A:
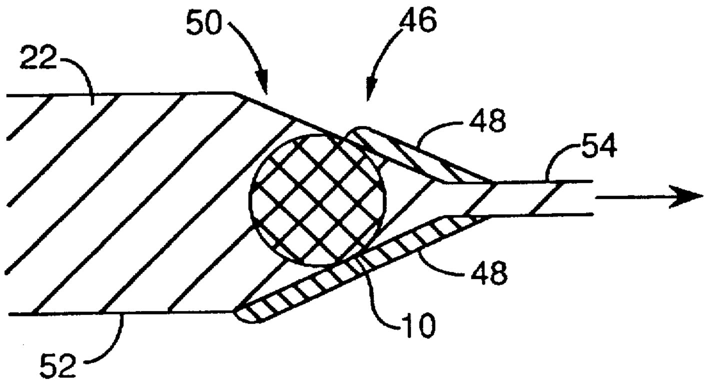
FIG. 6A and 6B illustrate a flow-regulator.
Figure 6B:
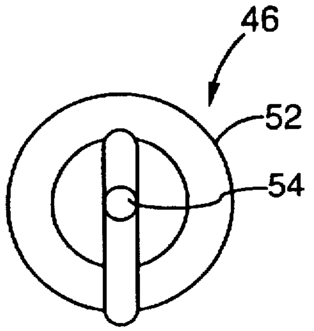

FIG. 6A and 6B illustrate a microtube flow-regulator 46. Bypass tubes 48 are joined along their entire length to a conically-shaped transition 50 placed in-between the large-diameter microtube 52 and small-diameter microtube 54. Furthermore, the length of the joined-bypass tubes 48 (now better described as bypass channels) up the conical transition 50 can be varied. Increased pressure forces the nonwetting droplet 10 further into the conical transition 50 exposing more flow channel openings to wetting-fluid 22. The result is increased flow of the gas or wetting fluid as a function of pressure. By suitable sizing the nonwetting droplet 10, correctly shaping the transition 50 cone, and precisely emplacing bypass channels 48, this device 46 can function as a microtube pressure-relief (or microtube safety) valve; i.e., no flow occurs until some predetermined pressure is exceeded. Flow then takes place as long as pressure is maintained. It should be noted that only two bypass-flow channels are shown in FIGS. 6A and 6B. This was done to simplify drawing. Any convenient number, one or more, of channels can be employed. Finally, by making bypass-flow channels vary in cross-sectional area as they are emplaced on the conical transition section, uniformly increasing or decreasing flow can be made to occur as a function of pressure.

Figure 7A:
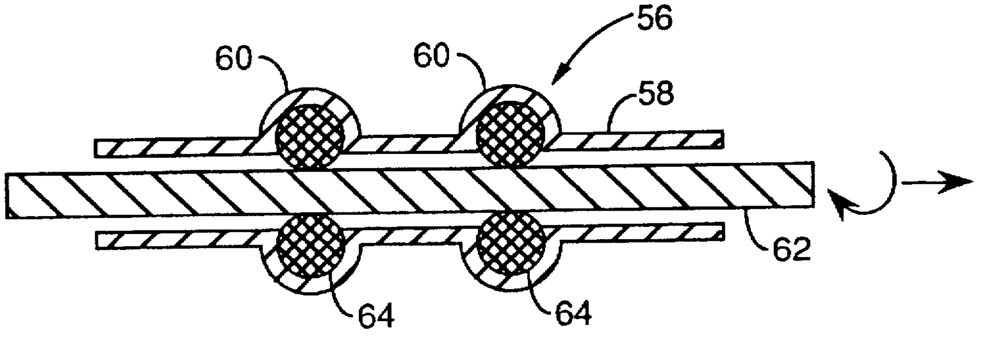
FIGS. 7A, 7B and 7C illustrate various microtube bearing assemblies.
Figure 7B:
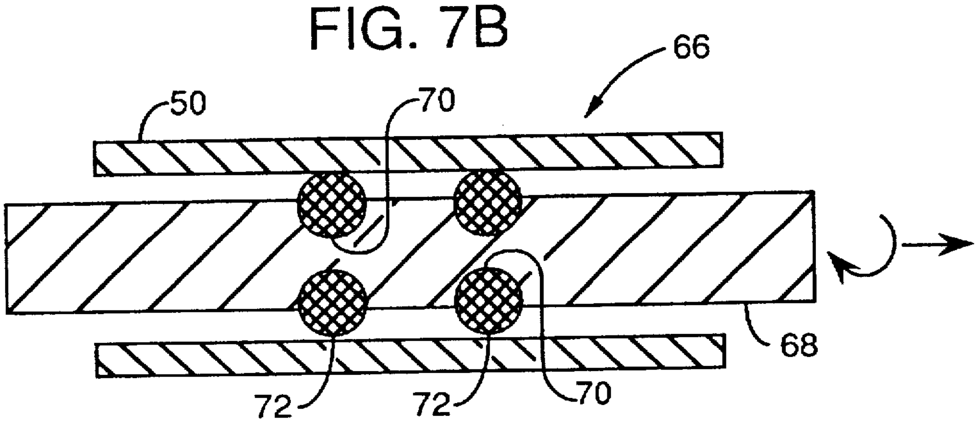
Figure 7C:
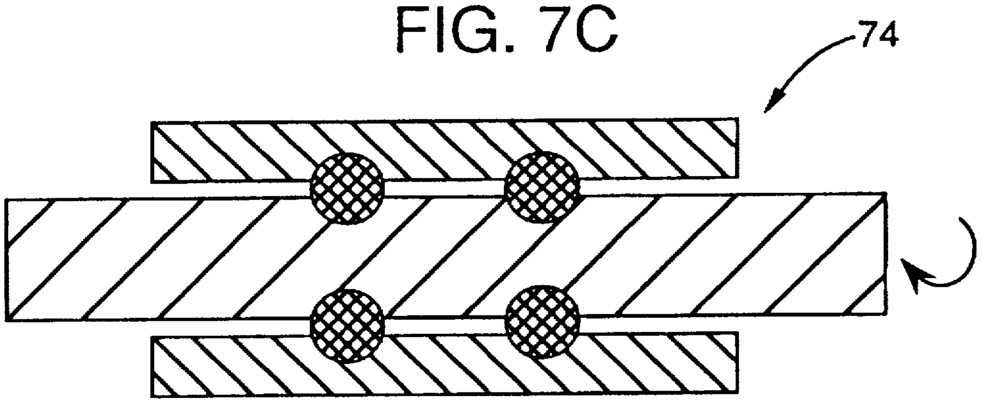

Another microtube device which derives its capabilities from surface tension and wettability, and which also is only operational at microscales, is a microtube liquid-bearing as shown in FIGS. 7A, 7B and 7C. Referring to FIG. 7A, for example, the bearing assembly 56 is a microtube 58 with one or more circular channels 60 on its circumference which actually join the microtube's interior void space in a narrow ring-shaped opening. A center rod 62 only slightly smaller in diameter than the bearing assembly is supported by nonwetting fluid 64 filling the circular channels 60. As before, this fluid 64 cannot leak out around the center rod 62 because too much pressure is required to form the smaller-radius droplet that would be able to leak. The center rod 62 is therefore free to either rotate or translate axially within the bearing assembly 56. It is referred to as an external bearing because of this outside configuration. The only restraining forces involved are frictional ones between center rod and nonwetting fluid.

FIG. 7B illustrates a reciprocal situation, and is referred to as a microtube internal bearing 66. A straight walled microtube 58 is used. A central rod 68 has at least one groove 70 about the circumference and the nonwetting fluid 72 fills this groove 70 which allows both rotational and translational motion. FIG. 7C is a mixed combination of internal and external microtube liquid-bearing locations. In this configuration 74, however, only rotational motion is easily achieved. For translation to occur, shearing of wetting droplet must take place. While this is not as difficult as forming a small-radius annular droplet, it still involves generation of new droplet-surface area, and therefore requires more force to produce translation than for either the purely internal or purely external bearings.

Figure 8:
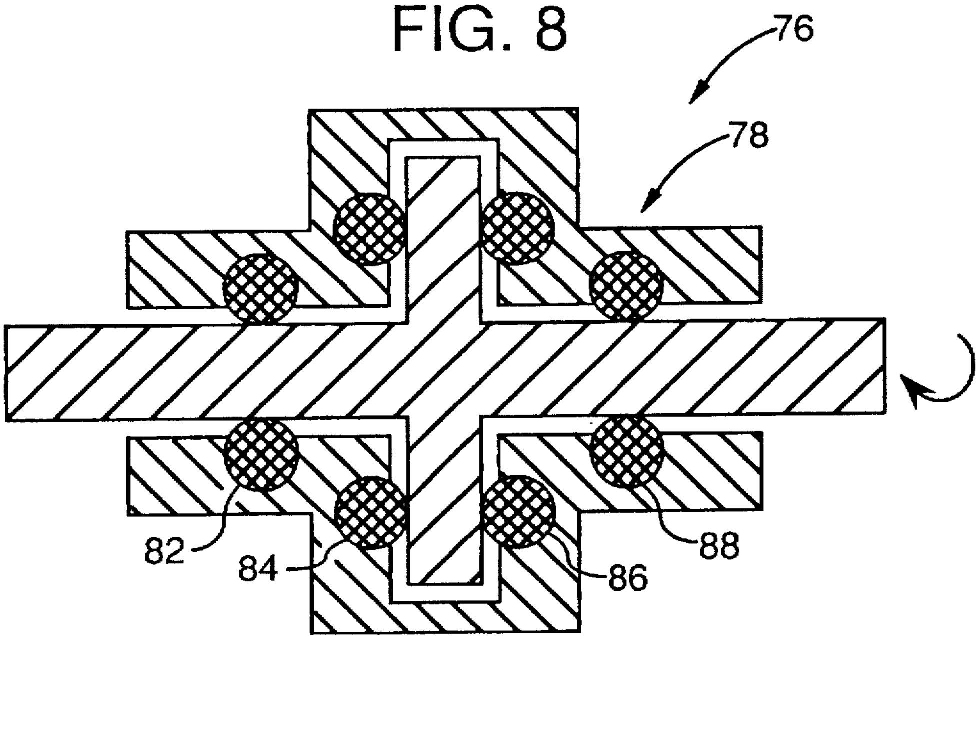
FIG. 8 illustrates a thrust bearing.

FIG. 8 illustrates a microtube liquid-bearing 76 that will not allow significant translational motion. It is a thrust bearing 78 utilizing four separate microtube liquid-bearings 82, 84, 86 and 88 in an external configuration. As before, an internal or mixed configuration is also possible, and additional microtube liquid bearings utilizing surface-tension/wettability effects can be employed. One technique for fabricating these microtube liquid bearings would be to form specialized mandrel having the shapes of the bearings internal voids from a fiber. After appropriate deposition, the internal mandrel would be removed leaving the bearing.

The preceding microtube devices, flow controllers and bearings, utilize surface tension and wettability in a manner that is not possible with macroscopically-sized similar devices (i.e., flow controllers and bearings) whose dimensions are on the order of centimeters, not microns. However, they are both relatively simple and should not be thought of as the most rigorous examples of the capability of microtube devices utilizing surface tension and wettability.

Figure 9A:
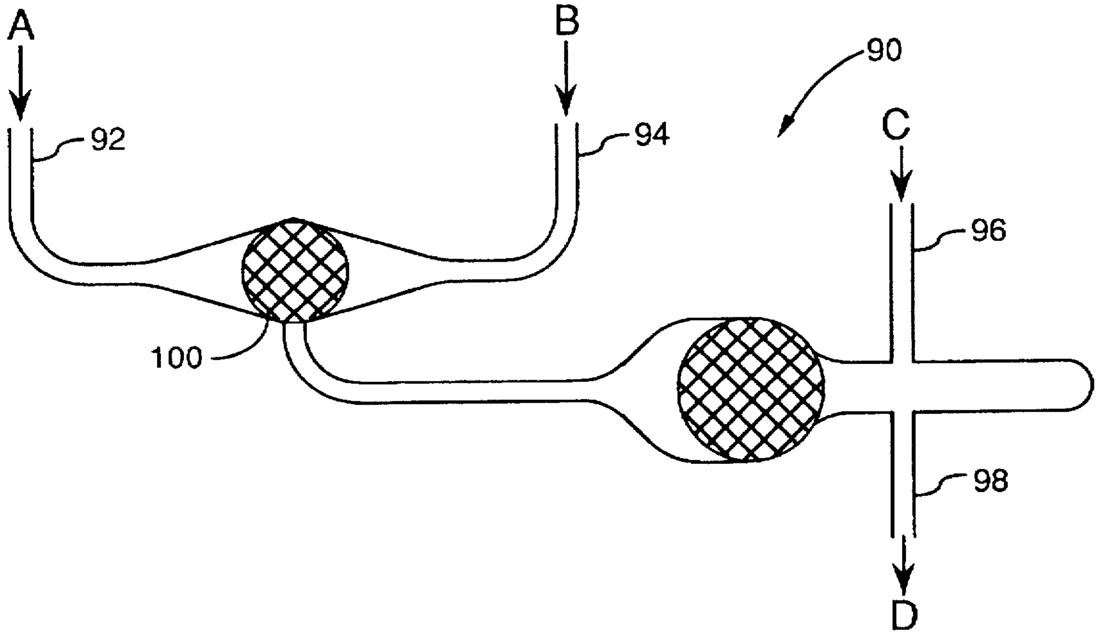
FIG. 9A and 9B illustrate the microtube device being operated as a NOR gate.
Figure 9B:
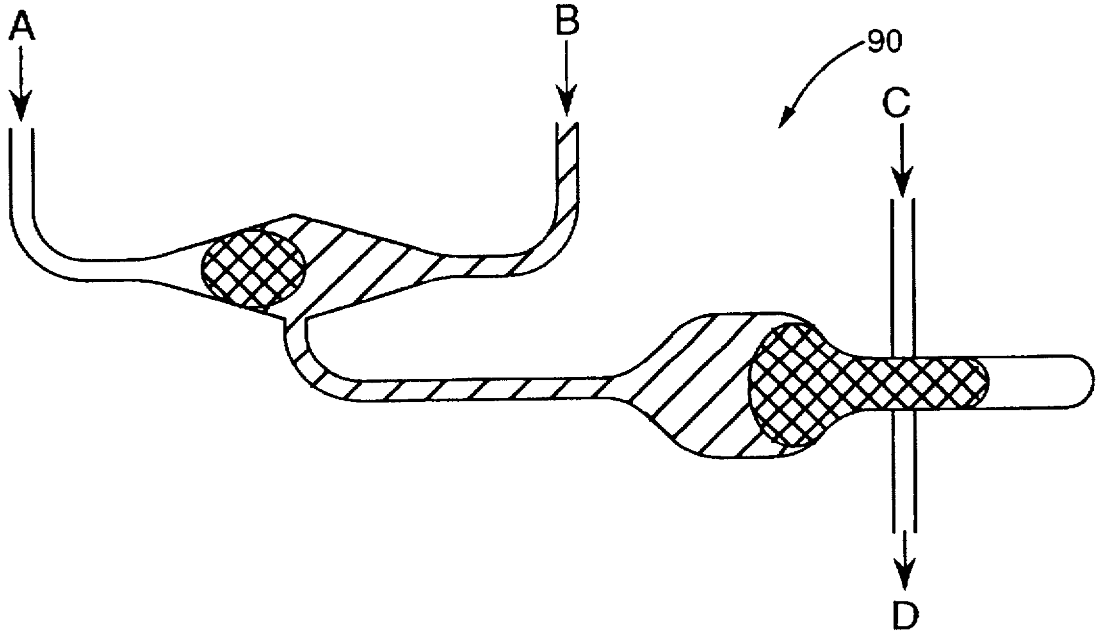

FIGS. 9A and 9B present a microtube device utilizing surface tension and wettability, which is capable of much more complex operations, it is a microtube logic circuit 90 that is fully digital, not analog, in nature. It obeys the NOR algorithm; i.e., if pressure is applied to either A or B branches 92 and 94, respectively, the gate will close as in FIG. 9B and no flow will occur (and no pressure will be transmitted) between C and D branches 96 and 98. If equal pressure is applied to A and B, or no pressure is applied to A and B, the gate will open as in FIG. 9A and flow (and pressure will be transmitted) between C and D. The non-wetting droplet 100 is returned to center position whenever pressure is removed because surface tension always minimizes droplet surface area, and a sphere has the lowest surface area per unit volume of any object. Only at the center position can it be a sphere, and unless placed under unbalanced force by pressure from A or B, it will remain at center.

Other kinds of logic circuits, such as OR and AND gates, are also capable of being fabricated in this manner. By combining a number of them together in a suitable arrangement, digital operations can be performed in a manner identical to electrical devices. Instead of electricity either being on or off in a circuit, pressure would be applied or not applied or fluid flow would or would not occur.

Clearly, many modifications and variations of the present invention are possible in light of the above teachings and it is therefore understood, that within the inventive scope of the inventive concept, the invention may be practiced otherwise than specifically claimed.

What is claimed is:

1. A device, said microtube device comprising a microtube which uses surface tension and wettablility in its functioning having a gas or wetting fluid flowable therein, said gas or wetting fluid flowable in at least one channel, said gas or wetting fluid operating upon at least one nonwetting fluid therein, said nonwetting fluid having a predetermined shape within said at least one channel.

2. A microtube device as defined in claim 1 wherein said microtube device functions as a: a check valve, a flow-limiter, a flow-restrictor, a flow regulator, a shaft holding device or a microtube digital logic circuit.

3. A microtube device as defined in claim 2 wherein said check valve comprises:

at least one input section, said input section being a small diameter microtube;

at least one output section, said output section being a small diameter microtube;

a control section, said control section being a microtube of a larger diameter, ends of said control section being integrally formed with said smaller diameter microtube of said input and output sections;

at least one by-pass channel, said by-pass channel being a microtube, said by-pass channel having one end connected into said control section about one end, the other end of said by-pass channel being connected into said output section;

whereby at least one nonwetting droplet is placed inside of said control section and a gas or wetting fluid may flow therethrough, if said gas or wetting fluid flows in the direction of said output section, a flow of said gas or wetting fluid will continue, and if said gas or wetting fluid flows in the direction of said input section, a flow of said gas or wetting fluid will stop.

4. A microtube device as defined in claim 2 wherein said flow-limiter comprises:

a control section, said control section being a microtube;

an input section, said input section being a microtube of a smaller diameter than said control section, said input section integrally connected to one end of said control section;

an output section, said output section being a microtube of a smaller diameter than said control section, said output section integrally connected to the other end of said control section than said input section;

said control section having at least one nonwetting droplet inserted therein when in use, said at least one nonwetting droplet being in close contact with said microtube, a gas or wetting fluid flowing through said flow-limiter, said gas or wetting fluid causing said at least one nonwetting droplet to translate back and forth within said control section; said at least one nonwetting droplet blocking the flow of said gas or wetting fluid when coming in contact with an entrance to said input or said output section, said flow-limiter allowing a predetermined flow of fluid or gas therethrough.

5. A microtube device as defined in claim 4 wherein said flow-limiter has at least one nonwetting droplet therein smaller than the inside diameter of said control section but larger in diameter than said input and output section whereby the gas or wetting fluid is able to flow past the nonwetting droplet till the pressure or flow is great enough to move said droplet to block said input or output section.

6. A microtube device as defined in claim 2 wherein said flow regulator comprises:

an input section, said input section being a microtube;

a conical transition section, said conical transition section integrally attached to said input section, said transition section having a decreasing diameter from said input section, said transition section having an outlet;

an output section, said output section being a microtube and being integrally connected to said transition section at said outlet;

at least one bypass flow channel, said at least one bypass flow channel being integrally connected to said transition section and said output section whereby a gas or wetting fluid may flow, said at least one surface of said bypass flow channel being joined to the surface of said conical transition section;

said conical transition section having positioned therein when in use at least one nonwetting droplet being of a smaller diameter than said input section, a pressure from said gas or wetting fluid determining a quantity of fluid to flow through said transition section.

7. A microtube device as defined in claim 2 wherein said shaft holding device comprises:

a microtube support, said microtube support being a microtube;

at least one microtube channel integrally formed about said microtube support on an inside wall of said microtube whereby when a nonwetting fluid is placed in said channels a portion of said nonwetting fluid will extend into an inside void of said microtube support; and a central rod, said central rod being placed within said microtube support in rotatable and translatable contact with said nonwetting fluid.

8. A microtube device as defined in claim 2 wherein said shaft holding device comprises:

a microtube support, said microtube support being a microtube; and a central rod, said central rod being placed within said microtube support, said central rod having at least one channel formed in the outer circumference, a nonwetting fluid being placed in said channel when in use, said fluid further contacting an inside wall of said microtube support, said central rod being rotatable and translatable within said microtube support.

9. A microtube device as defined in claim 2 wherein said shaft holding device comprises:

a microtube support, said microtube support being a microtube, said microtube support have at least one channel formed on an inside wall of said microtube; and a central rod, said central rod being placed within said microtube support, said central rod having at least one channel formed in the outer circumference of said central rod, a nonwetting fluid being placed in said channels of said microtube support and said central rod when in use, said central rod being rotatable within said microtube support.

10. A microtube device as defined in claim 7 wherein said shaft holding device further comprises:

a thrust bearing, said thrust bearing comprising:

a central disk, said central disk formed about said central rod;

a central disk housing, said central disk housing being formed integrally into said microtube support, said central disk fitting closely within said housing, at least two ring shaped channels integrally formed into opposite inside walls of said housing, a nonwetting fluid being positioned within said ring shaped channels when in use, said nonwetting fluid in further contact with said central disk.

11. A microtube device as defined in claim 2 wherein said microtube digital logic circuit comprises at least one AND, NAND, OR, NOR, or NOT gates.

12. A microtube device as defined in claim 11 wherein said microtube digital logic circuit NOR gate comprises:

at least one first logic component, said first logic component having two inputs, each input being a microtube; a control section, said control section having said inputs connected opposite to each other, said control section being essentially two conical sections connected together at a larger end thereof, each input being connected to a smaller end of each conical section; an output, said output connected into said control section between said inputs, said control section having at least one nonwetting droplet therein when in use, a gas or wetting fluid or gas flowing from either one or both of said inputs to said output; and at least one second logic component, said second logic component having an input, said input being a microtube, said input being said output of said first logic component; a control section, said control section having said input connected into one end, said control section being a microtube of a larger diameter than said input, said control section having an output, said output being a microtube larger than said input but smaller than said control section, said output being of a short length; and a control input microtube and a control output microtube being connected into said output from said control section whereby when at least one nonwetting droplet in said control section is pressed into said output of said control section, said droplet will block a flow of gas or wetting fluid from said control input to said control output.

* * * * *

UNITED STATES PATENT AND TRADEMARK OFFICE
CERTIFICATE OF CORRECTION

PATENT NO. : 5,789,045

DATED : 4 August 1998

INVENTOR(S) : Wapner et al

Figure 2:
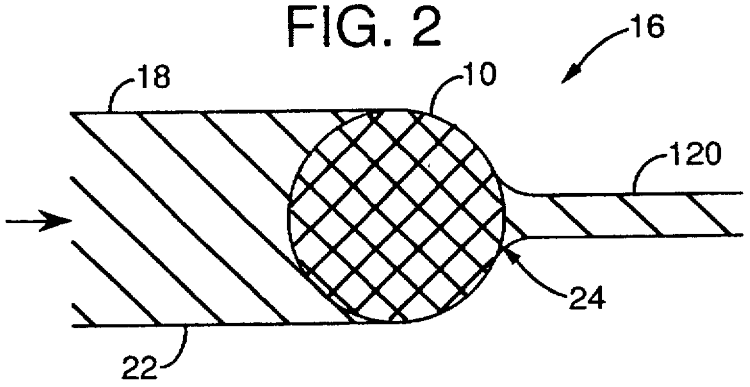
FIG. 2 illustrates a microtube being of different diameters with a flow blocking droplet therein.
Figure 3A:
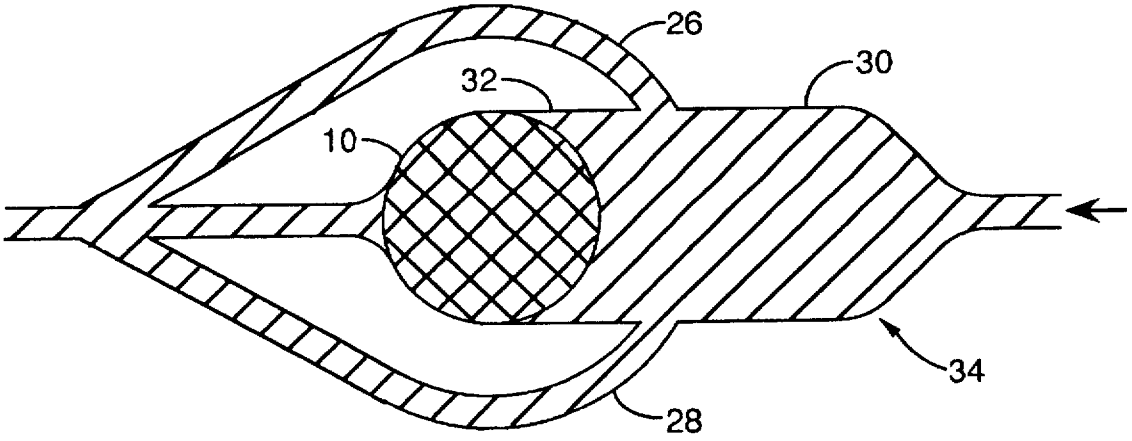
FIGS. 3A and 3B illustrate a check-valve.
Figure 3B:
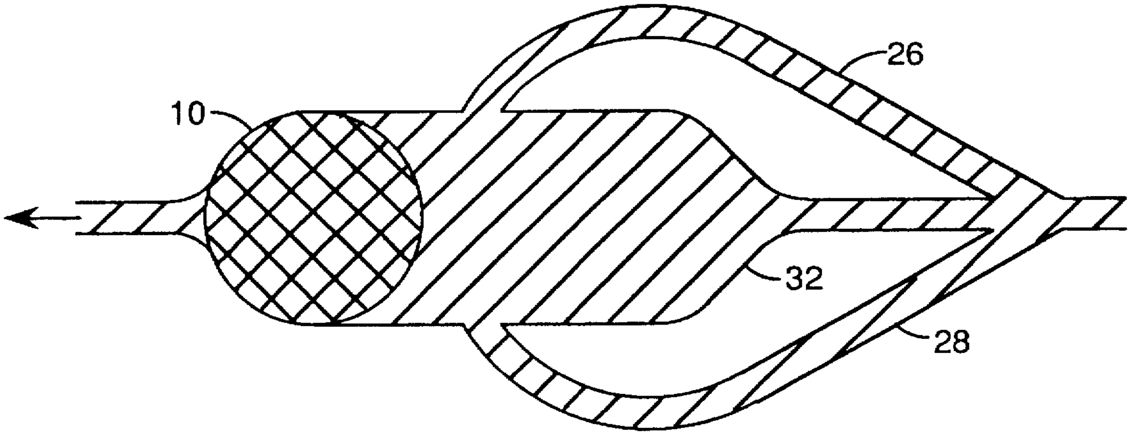

It is certified that error appears in the above-identified patent and that said Letters Patent is hereby corrected as shown below:

In Figure 2, "120" should be "20".

In Figure 7B, "50" should be "58".

In column 3, line 6, "12" should be "18".

Signed and Sealed this

Twenty-third Day of March, 1999

*Attest:*

Q. TODD DICKINSON

*Attesting Officer* *Acting Commissioner of Patents and Trademarks*